Dec. 11, 1934.                H. WALTER                1,984,166
       METHOD AND DEVICE FOR DETERMINING THE PROPERTIES
              OF STRATIFIED OR FIBRILLATED MATERIALS
                  Filed Jan. 6, 1931        2 Sheets-Sheet 1

INVENTOR
HANS WALTER
BY
Fika & Kehlenbeck
ATTORNEYS.

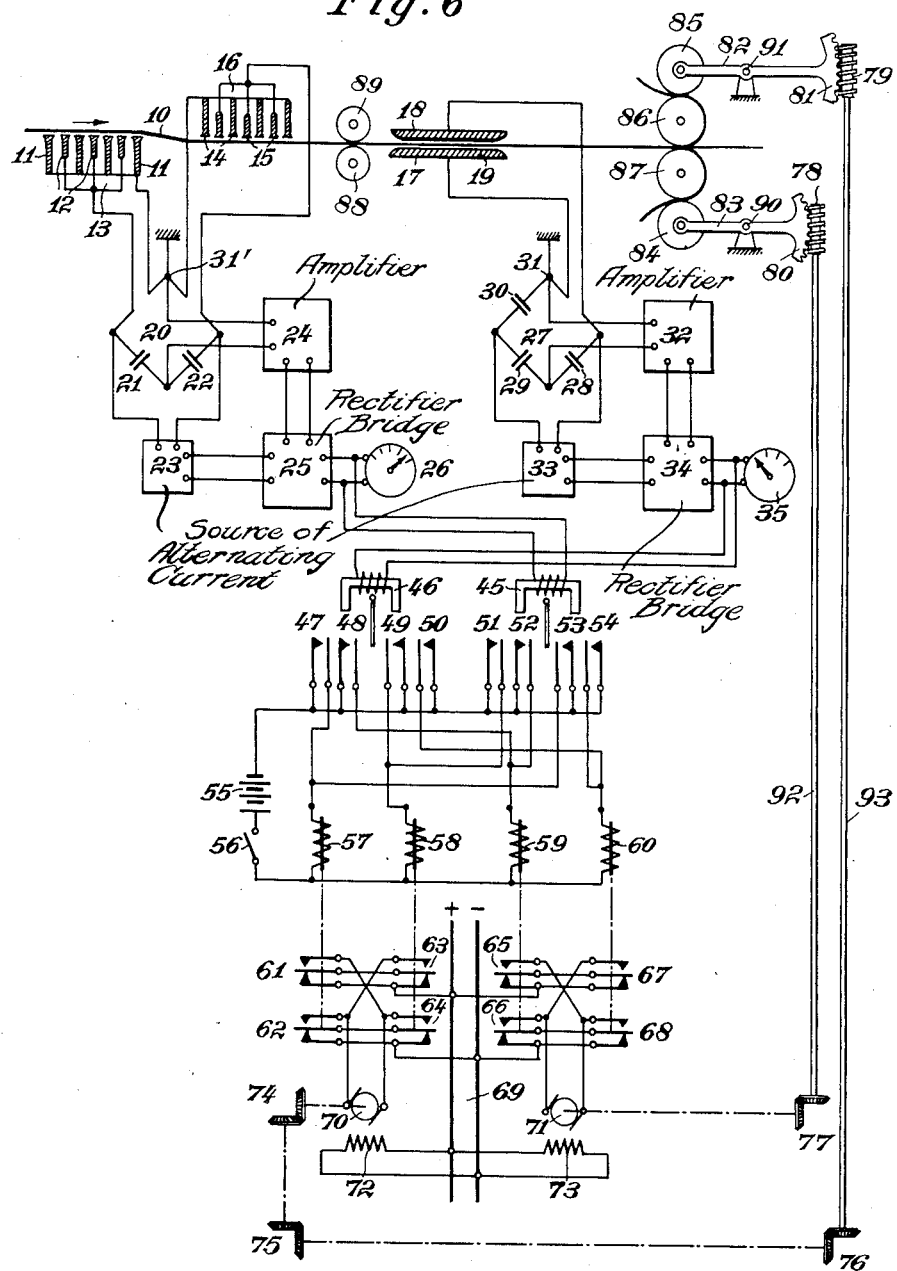

Patented Dec. 11, 1934

1,984,166

UNITED STATES PATENT OFFICE 1,984,166

METHOD AND DEVICE FOR DETERMINING THE PROPERTIES OF STRATIFIED OR FIBRILLATED MATERIALS

Hans Walter, Berlin-Charlottenburg, Germany, assignor to Siemens & Halske, Aktiengesellschaft, Siemensstadt, near Berlin, Germany, a corporation of Germany Application January 6, 1931, Serial No. 506,858
In Germany April 26, 1930

31 Claims. (Cl. 18—2)

The invention relates to a device for determining the properties of stratified or fibrillated materials, such as gummed tissue, paper, cord, fabric and the like. The new device permits, for instance, of determining the thickness of the different layers which constitute a combined plane body, or of determining the moisture of stratified or fibrillated material. This may be achieved in that the material to be tested is placed as dielectric between the two electrodes of a condenser, the capacity of which is a function of the moisture content of the material between the two electrodes, as the dielectric constant, for instance of water, is much greater than that of the material. Using the known condensers for this purpose has, however, the drawback that slight variations in the thickness of the material affect the capacity as much as do variations in the moisture content. Besides the sensitivity is not sufficient for many purposes.

In the device according to the invention, the electrodes are arranged in such a manner that the electric field used for the measurement runs entirely or partly in parallel with the direction of the layers or fibres. The invention is based on the consideration that in these stratified materials strata of water alternate with such of the fabric or other material so that, if the field runs vertically to the stratification, the capacity of the condenser may be computed in the same manner as that of series-connected partial condensers containing alternately woven material and water as dielectric. The fabric condensers predominate in this case as being those with the smaller capacity, which fact results in the sensitivity of the device being higher in regard to variations in thickness than in moisture. If, however, the field runs in parallel with the direction of the strata or fibres, the capacity of the condenser is computed as that of parallel-connected partial condensers, and the water condensers as being those with the greater dielectric constants, as compared with the fabric condensers, are of materially greater weight than in the known device. The sensitivity of the new device is therefore increased, say in the ratio of the dielectric constant of the liquid to that of the fabric, as compared with the known device, so as to make the method, according to the invention, particularly suitable for determining the water content. The same holds good for the determination of any included substances in cases where the dielectric constant of the fabric or material is smaller than that of the substance contained therein.

If, on the other hand, a condenser according to the invention, is to be used for determining the thickness of different layers constituting a substantially plane body, the body to be tested is arranged to be the dielectric of such a condenser, in which all the electrodes are on the one side of the dielectric, so that the electric field runs substantially in parallel with the direction of the layers. The capacity of such a condenser depends on the thickness of the layers constituting the body, provided these layers consist of materials having different dielectric constants. If the body comprises more than two layers, use is preferably made of a number of condensers equal to the number of layers and arranged, in a manner to be described later, so as to permit of determining the thickness of each layer.

The accompanying drawings show several constructional examples for carrying out the invention, similar parts being designated by like reference characters.

Fig. 6 shows a measuring device which can be used for controlling purposes in manufacturing stratified material.

Figure 1:
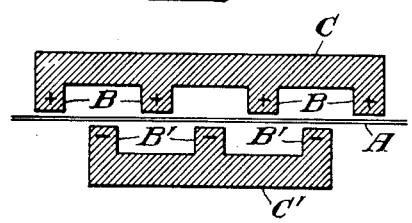

In Fig. 1 the condenser electrodes B and B' have been given the shape of bar-shaped elevations or humps on the metal plates C and C' and the plates are arranged in such a manner that the elevation on one plate is opposite a groove in the other plate. The fabric or material A whose strata direction runs parallel with its longitudinal extension, is led through between the plates.

Figure 2:
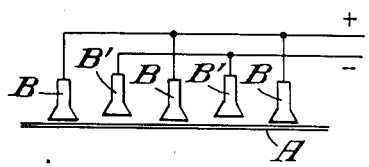

In Fig. 2 the electrodes B and B' are placed on the same side of the fabric or material A. They are alternately interconnected, so that the electric field runs again in parallel with the stratification. In order to concentrate the field in the material, the electrodes have been given the form of pole-shoes and to decrease the leakage current, as compared with the shift current, every second electrode can be slightly offset as shown so that the material is in contact only with condenser electrodes of the same polarity. The arrangement of the electrodes on one side only of the material has the advantage that such a condenser is not bound to the margin of the width of the material, but can easily be brought to any place.

Figure 3:
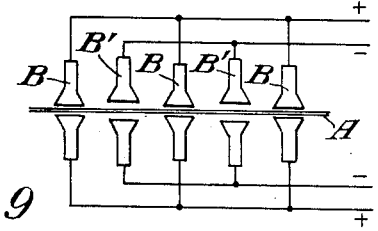

In Fig. 3 the arrangement of Fig. 2 is shown duplicated on the other side of the fabric, and opposing electrodes are interconnected so as to be of the same polarity. The capacity can be measured according to well-known methods, for instance, with statically applied voltage, preferably however, with alternating current. The current acted on by the capacity of the condenser can in this case be used to control automatically a device drying or moistening the fabric, viz. electrically heated drying drums so as to give the fabric a predetermined moisture content.

The method is not limited to the determination of the moisture content, but can, under certain conditions, also be used to determine other included substances. Devices according to the invention can, for instance, be used to control prepared material, viz, paraffined paper, impregnated wood or the like.

Figure 4:
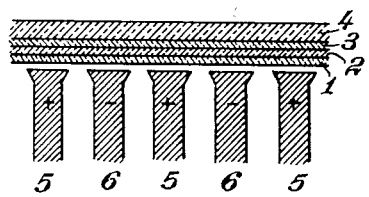
Figs. 1 to 4 represent condensers according to the invention, Figs. 1 and 4 being sections, and Figs. 2 and 3 elevations.
Figure 8:
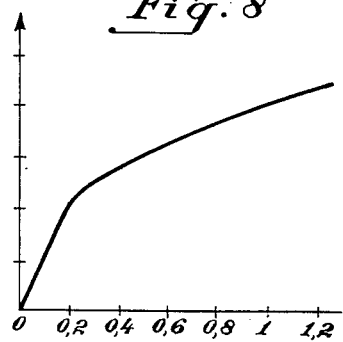
Fig. 8 represents a curve as plotted in capacity measurements by means of the new device.

The body to be tested shown in Fig. 4 is composed of the layers 1, 2, 3 and 4. Every two neighbouring layers may have different dielectric constants. The body is placed on the condenser consisting of the electrodes 5 and 6 and determines the capacity of this condenser. The principle of this capacity determination is clearly visualized by the curve in Fig. 8. In this figure, such capacities have been plotted as have been measured by means of such a condenser, if the dielectric consists of a single layer of variable thickness. The thickness of the layer has been plotted as abscissæ, the capacity as ordinates. The curve runs first in a straight line, has then a bend and afterwards a materially flatter characteristic. It will be seen that the electric field substantially penetrates into the dielectric only to a certain depth, which is indicated by the bend. The depth of penetration depends on the edge spacing of the two sets of pole-shoe-shaped electrodes of which the condenser is constituted according to Fig. 4.

If therefore for instance the thickness of the layer 1, of the body shown in Fig. 4 is to be determined, the distance between the electrodes 5 and 6 must be chosen so that the penetration depth of the electric field is only slightly greater than the maximum thickness of the layer 1. Under these conditions, variations in the thickness of this layer produce the strongest variations in the capacity of the condenser. If furthermore, also the thickness of the layer 2 is to be determined, a second condenser of similar construction is arranged so that its field penetrates into the body under test to a depth slightly greater than the thickness of the layers 1 and 2 together.

Figure 5:
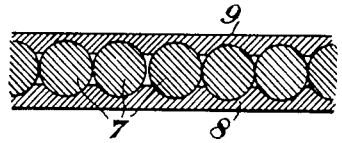
Fig. 5 shows a section through a body for the control of which the new device is particularly suitable.

Most suitable for the measurement are bodies in which the dielectric constant of the lower layer is obviously smaller than that of the surface layer. This holds for instance good for the gummed tissue whose cross-sectional area is shown in Fig. 5. This tissue or fabric consists of parallel cord threads and is gummed on both sides. It is used in the motor car tire manufacture. The threads 7 are used to carry the two rubber layers 8 and 9 which may be placed on the cord layer by means of a four-roller calender. In this case, the dielectric constant of the rubber is materially higher than that of the fibrous tissue.

For the simultaneous control of a uniform thickness of both rubber layers, during their manufacture, use can be made of a device according to Fig. 6. The cord tissue 10 gummed on both sides runs in the direction of the arrow firstly parallel with the end faces of the electrodes 11 and 12 of the condenser 13 and then parallel with those of the electrodes 14 and 15 of the condenser 16. Then it is led between the electrodes 17 and 18 of a third condenser 19. In this third condenser, the electrical field will be substantially perpendicular in the dielectric to the direction of the rubber layers, whereas in the condensers 13 and 16, each of which has electrodes on only one side of the fabric, the electrical field will be substantially parallel in the dielectric with the direction of said layers. In the practical performance the condensers 13 and 16 are preferably arranged so as to make the bar-shaped electrodes lie parallel with the threads of the cord tissue. It is thereby possible to obtain a greater measuring accuracy, since the electric field runs in this case parallel with the drawing plane of Fig. 5 and perpendicularly to the thread direction and, consequently, the dielectric constant of the whole of the fibres is smaller than if the electric field ran parallel with the fibre.

The condensers 13 and 16 are connected to the two arms of an A. C. measuring bridge 20, to the other two arms of which are connected the condensers 21 and 22. The measuring voltage is supplied by an A. C. source 23, which operates for instance at a frequency of 800 cycles per second. One of the diagonal points 31' of the bridge is grounded and an amplifier 24 of the usual type is connected to the diagonal arm.

If the two rubber layers are equal in thickness, the capacities of the two condensers 13 and 16 are equal in magnitude and the bridge is balanced. A disturbance of this balance indicates that one of the rubber layers is thicker than the other. In order to show such a variation, a rectifier bridge 25 indicating the measuring current through the galvanometer 26, is connected to the amplifier 24.

This galvanometer may be regarded as a symmetry indicator, since it indicates the variations from the uniform allotment of the rubber on the two sides of the cord tissue.

Figure 9:
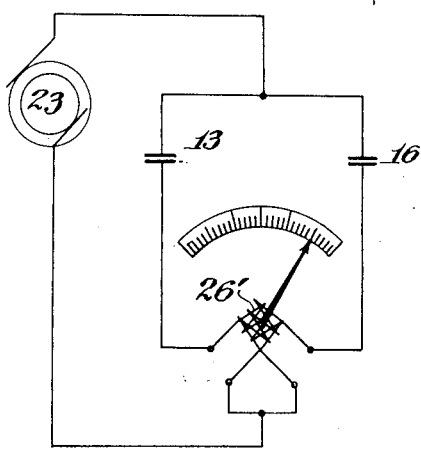
Fig. 9 is a diagrammatic view illustrating a modification of a portion of the device shown in Fig. 6.

Instead of the bridge connection 20, use may also be made of another symmetrical connection of the two condensers, which, in case of capacity differences between them, results in deflections at the measuring instrument. The two condensers 13 and 16 might, for instance, as shown in Fig. 9 each be connected in series with one of the coils of a crossed-coil dynamometer 26'.

In order to enable not only the variations in symmetry but also the absolute thickness of the rubber layers to be controlled, I have provided the condenser 19. This condenser is connected to one of the arms of an A. C. measuring bridge 27, the other arm of which contains the condensers 28, 29 and 30. The diagonal point 31 is again grounded and the amplifier 32 is connected to the diagonal arm. The measuring current is supplied by the A. C. source 33. For indication purposes, use can again be made of a rectifier bridge 34 connected to 32 and 33 and to a galvanometer 35.

Figure 7:
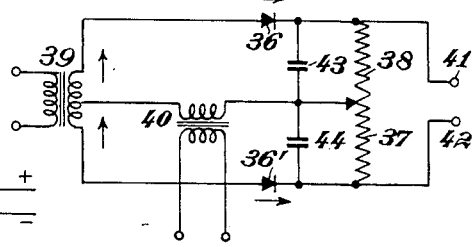
Fig. 7 is a special part of the connection shown in Fig. 6, the principle of the arrangement shown in Fig. 7 being disclosed in Letters Patent of the United States No. 1,919,284, dated July 25, 1933.

A constructional example of the rectifier bridge 25 or 34 is shown in Fig. 7. It comprises the two rectifiers 36 and 36' whose transmission directions are indicated by the arrows and the two reisistances 37 and 38 bridged for the A. C. component of the circuits. The rectifiers are connected to the secondary of a transformer 39, whose primary is connected to the A. C. source. In the middle of the secondary of the transformer 39 there is tapped a lead to the secondary of a second transformer 40, whose other end is connected between the resistances 37 and 38. The voltage under test is applied to the primary of the transformer 40. The measurement is carried out by means of a galvanometer which may be applied to the terminals 41 and 42, connected in parallel with the two resistances 37 and 38. A strong alternating voltage is supplied to the rectifiers 36, 36' from the secondary of the transformer 39, and produces in the resistances 37, 38 equal currents which have no effect on the galvanometer. The balance of these currents is disturbed by the voltage under test, applied to the primary of the transformer 40; for instance, if the current induced in the secondary of this transformer 40 is such as to increase the current in the resistance 38, it will simultaneously reduce the current in the resistance 37, and the galvanometer will exhibit a corresponding deflection. This will be understood readily from the following consideration: Owing to the midpoint connection at the secondary of transformer 39, the voltage of the currents flowing through the resistances 37 and 38 will be of equal amplitude, but different in phase; that is to say, if during the first half-cycle such current flows through the resistance 37, the current will flow through the resistance 38 during the second half-cycle, it being understood that the alternating currents are rectified by the rectifiers 36, 36'. The voltage of the current supplied by the secondary of transformer 39 is always greater than that of the voltage supplied by the transformer 40. If we assume that the voltage of the direct current derived from the transformer 39 is $V$ and that the voltage of the direct current derived from the transformer 40 is $V'$, there will flow through the resistance 38 during the first half-cycle a current proportional to the sum or resultant of $V$ and $V'$, while during the second half-cycle the current flowing through said resistance will be proportional to the difference or resultant $V-V'$. Exactly the opposite will take place at the same time in the resistance 37. Since these currents act in opposite directions on the instrument 26 or 35, the deflection of this instrument will be proportional to the difference between the two values given above, that is, proportional to $(V+V')-(V-V')=2V'$. Thus the voltage $V$ due to the transformer 39 has no influence on the indications of the instruments, such indications depending solely on the voltage $V'$ due to the transformer 40. If the bridge is unbalanced in the opposite direction, the phases will be shifted by 180° so that in the resistance 38 there will be a current proportional to $V-V'$ and in the resistance 37 a current proportional to $V+V'$. The deflection of the instrument will therefore be in this case proportional to $(V-V')-(V+V')=-2V'$, thus showing again that the instrument is not influenced by the voltage $V$. It will be noted that in one case the instrument 26 will be deflected to one side and in the other case to the other side, thus indicating which of the two rubber layers 8, 9 is the thicker one, the deflection being also proportional to the difference between the thicknesses of these two layers.

Instead of the indicating instruments 26 and 35 or simultaneously with them, use may be made of relays which are controlled automatically by the rollers of the gummed calender in such a manner that the two rubber layers have always the desired thickness.

In order to control the thickness of the two rubber layers, the calender rollers are adjusted to different distances. The adjustment can be achieved with the aid of, for instance, electromotors, whose driving currents are controlled by relays, connected to the switching devices described above. For each calender roller provision is made for a special motor which decreases and increases the distance between the rollers on being moved forward and backward respectively. For enabling these motors to be controlled, the polarized relays 45 and 46 are connected in parallel with the instruments 26 and 35 respectively.

These relays operate the contacts 47 to 54 serving for the closing of circuits in which are connected the voltage source 55, the switch 56 and the relay windings 57 to 60. Each armature of these relays 57 to 60 is designed to operate two of the switches 61 to 68. The last-named switches are used to cut in the currents received from a public supply 69, which set the motors 70 and 71 in motion. The stator windings of the motors are indicated by the coils 72 and 73. The armature rotations of these motors are transmitted to the bars 92 and 93, with the aid of the bevel gearings 74 to 77. At the end of these bars, there are fitted the threads or worms 78 and 79, which engage with the teeth of the segments 80 and 81. The double levers 82 and 83, pivoted at 90 and 91 respectively, carry, on the one hand, the segments, on the other hand the calender rollers 84 and 85. Between these rollers and the rollers 86 and 87 there are passed the rubber layers which are pressed upon the cord tissue and the adjustment of the distances between the rollers 84, 87 and 85, 88 respectively permits of varying the thickness of the rubber layers. The rollers 88 and 89 between the condensers 16 and 19 serve for the transport of the gummed tissue.

The operation of this relay device is as follows: in the case, for instance, that the symmetry indicator 26 is at zero (which means that the two rubber layers are equal in thickness) and that the galvanometer 35 associated with the condenser 19 indicates too great a thickness, the relay 57 is operated and closes the contacts 47 and 48, thus producing a current in the coils 57 and 59, which serves for the operation of the switches 61 and 62 and 65 and 66 respectively. Consequently a current flows through the armature windings of the motors in such a manner that the motors decrease the distance between the calender rollers.

If, on the other hand, the galvanometer 35 associated with the condenser 19 indicates a correct total thickness of the two rubber layers and if one of the rubber layers is thicker than the other, the relay 46 remains in the position of rest and the relay 45 is operated, so as to close the contacts 51 and 52 which cause an energizing of the windings or coils 58 and 59. In this case, the switches 63 and 64 and 65 and 66 are operated, so as to set the motor 71 in motion in such a manner that the calender rollers having furnished too thick a layer are adjusted to a smaller distance, whereas the motor 70 increases the distance between the two other calender rollers.

Finally it may also occur that the total thickness indicator 35 as well as the symmetry indicator 26 vary from the normal position. The relays 45 and 46 operate in this case the contacts 47 and 48 and 51 and 52. The windings 57, 58 and 59 excited thereby operate the switches 61 and 62, 63 and 64 and 65 and 66. Consequently the motor 70 remains dead and the motor 71 is set in motion so as to reduce again the distance between the two calender rollers.

It remains in operation until either the thickness indicator or galvanometer 35 associated with the condenser 19 or the symmetry indicator 26 returns to normal, whereupon one of the adjusting operations takes place.

The new condenser device can also be used for measurements. In order to determine the thickness of a laid linoleum layer it is for instance possible to place a condenser such as shown in Fig. 2 or 4 on the linoleum and to determine the capacity of this condenser. The thickness of the layers of insulating material which is not accessible on both sides may also be determined in this way.

I claim:

1. In a device for determining the properties of stratified or fibrillated material by means of capacity measurement, a condenser having electrodes arranged in such a manner that the electric field in the dielectric runs entirely or partly in parallel with the layer or fibre direction.

2. In a device for determining the properties of stratified or fibrillated material by means of capacity measurement, a condenser having electrodes arranged in such a manner, that the electric field in the dielectric runs entirely or partly in parallel with the layer or fibre direction, two or several electrodes being arranged on one side of the material beside one another and alternately interconnected conductively.

3. In a device for determining the properties of stratified or fibrillated material by means of capacity measurement, a condenser having electrodes arranged in such a manner, that the electric field in the dielectric runs entirely or partly in parallel with the layer or fibre direction, one or several electrodes being arranged on either side of the material and alternately interconnected conductively in such a manner that opposite electrodes are applied to different voltages.

4. In a device for determining the properties of stratified or fibrillated material by means of capacity measurement, a condenser having bar-shaped electrodes arranged in such a manner that the electric field in the dielectric runs entirely or partly in parallel with the layer or fibre direction.

5. The method of determining the thickness of the layers of a body having substantially plane dimensions by introducing the material as dielectric into condensers having electrodes arranged in such a manner that the electric field in said material runs entirely or partly in parallel with the plane of said material, the number of said condensers being in accordance with the number of the layers under test, and utilizing the variations in the capacities of the several condensers produced by the presence of such body at the condensers, to affect an electrically operated device.

6. In a device for determining the thickness of the layers constituting a material of substantially plane dimensions by means of capacity measurement, a condenser having electrodes dimensioned and spaced in such a manner that the penetration depth of the electric field into the material introduced as dielectric is approximately equal to the thickness of said layers.

7. In a device for determining the thickness of the layers constituting a material of substantially plane dimensions by means of capacity measurement, a condenser having electrodes dimensioned and spaced in such a manner that the penetration depth of the electric field into the material introduced as dielectric is slightly greater than the thickness of said material.

8. In a device for determining the thickness of fibrillated material by means of capacity measurement, a condenser having electrodes arranged in such a manner that the electric field in the dielectric runs entirely or partly in parallel with the layer or fibre direction and suitable transport means.

9. In a device for determining the thickness of fibrillated material by means of capacity measurement, several condensers having electrodes arranged in such a manner that the electric field in the dielectric runs entirely or partly in parallel with the layer or fibre direction and suitable transport means.

10. The method of determining the thickness of gummed tissue by introducing said tissue as dielectric into condensers having electrodes arranged in such a manner that the electric field in the dielectric runs entirely or partly in parallel with the plane of said tissue, and utilizing the variations in the capacity of said condensers produced by the presence of such tissue at the condensers, to affect an electrically operated device.

11. In a device for determining the thickness of fibrillated material by means of capacity measurement, condensers having electrodes arranged in such a manner that the electric field in the dielectric runs entirely or partly in parallel with the plane of the tissue and suitable transport means, for passing said material successively through said condensers.

12. In a device for manufacturing gummed tissue by means of four-roller-calenders, two condensers having electrodes arranged in such a manner that the electric field in the dielectric runs entirely or partly in parallel with the plane of the tissue and being connected symmetrically in an electric measuring device.

13. In a device for manufacturing gummed tissue by means of four-roller-calenders, two condensers having electrodes arranged in such a manner that the electric field in the dielectric runs entirely or partly in parallel with the plane of the tissue and being connected symmetrically in A. C. bridge.

14. In a device for manufacturing by means of four-roller-calenders, tissue gummed on both sides, two condensers located respectively on opposite sides of such tissue and having electrodes arranged in such a manner that the electric field in the dielectric runs entirely or partly in parallel with the plane of the tissue, connected symmetrically in an electric measuring device and means for controlling the thickness of the individual rubber layers, acted on by said measuring device.

15. In a device for manufacturing by means of four-roller-calenders, tissue gummed on both sides, two condensers located respectively on opposite sides of such tissue and having electrodes arranged in such a manner that the electric field in the dielectric runs entirely or partly in parallel with the plane of the tissue, connected symmetrically in an electric measuring device, means for controlling the thickness of the individual rubber layers and a measuring instrument indicating differences in thickness of the two layers.

16. In a device for manufacturing by means of four-roller-calenders, tissue gummed on both sides, two condensers located respectively on opposite sides of such tissue and having electrodes arranged in such a manner that the electric field in the dielectric runs entirely or partly in parallel with the plane of said tissue, connected symmetrically in an electric measuring device and a third condenser having electrodes on opposite sides of the path of said gum tissue whereby the electrical field in the dielectric will run substantially perpendicular to the direction of the rubber layers so that the capacity of said third condenser will be a measure of the thickness of the two rubber layers together.

17. In a device for manufacturing by means of four-roller-calenders, tissues gummed on both sides, two condensers located respectively on opposite sides of such tissue and having electrodes arranged in such a manner that the electric field in the dielectric runs entirely or partly in parallel with the plane of said tissue, connected symmetrically in an A. C. bridge and a third condenser having electrodes arranged on opposite sides of the path of said gum tissue whereby the electrical field in the dielectric will run substantially perpendicular to the direction of the rubber layers so that the capacity of said third condenser will be a measure of the thickness of the two rubber layers together.

18. In a device for manufacturing by means of four-roller-calenders, tissues gummed on both sides, two condensers located respectively on opposite sides of such tissue and having electrodes arranged in such a manner that the electric field in the dielectric runs entirely or partly in parallel with the plane of said tissue, connected symmetrically in an electric measuring device, means for controlling the thickness of the individual rubber layers acted on by said measuring device, and a third condenser having electrodes on opposite sides of the path of said gum tissue whereby the electrical field in the dielectric will run substantially perpendicular to the direction of the rubber layers so that the capacity of said third condenser will be a measure of the thickness of the two rubber layers together.

19. In a device for manufacturing by means of four-roller-calenders, tissues gummed on both sides, two condensers located respectively on opposite sides of such tissue and having electrodes arranged in such a manner that the electric field in the dielectric runs entirely or partly in parallel with the plane of said tissue, connected symmetrically in an electric measuring device, means for controlling the thickness of the individual rubber layers, acted on by said measuring device, a measuring instrument indicating differences in thickness of the two layers, and a third condenser having electrodes on opposite sides of the path of said gum tissue whereby the electrical field in the dielectric will run substantially perpendicular to the direction of the rubber layers so that the capacity of said third condenser will be a measure of the thickness of the two rubber layers together.

20. In the manufacture of multiple layer fabrics by means of rollers, the method of automatically controlling the thickness of the layers of material which consists in measuring the dielectric constants of the said layers by means of a number of condensers equal to the number of layers, the electric field of said condensers running entirely or partly in parallel with the direction of said layers, and in causing deviations of the condenser capacities from their normal value to actuate relays which will cut in motors for adjusting the distance between said rollers.

21. In the manufacture of multiple layer fabrics, the method of automatically controlling the thickness of the layers of material which consists in measuring the dielectric constants of said layers by means of a number of condensers equal to the number of layers, the electric field of said condensers running entirely or partly in parallel with the direction of said layers, and in causing deviations of the condenser capacities from their normal value to actuate devices which adjust the thickness of said layers.

22. In a device for controlling a material of substantially plane dimensions, condensers having electrodes arranged in such a manner that the electric field in said material runs entirely or partly in parallel with the plane of said material, said condensers operated by alternating current.

23. In a device for manufacturing gummed tissue by means of four-roller-calenders, two condensers having electrodes arranged in such a manner that the electric field in the dielectric runs entirely or partly in parallel with the plane of the tissue, connected symmetrically in an electric measuring device, and a measuring instrument indicating differences in thickness of the two layers.

24. In a device for manufacturing gummed tissue by means of four-roller-calenders, two condensers having electrodes arranged in such a manner that the electric field in the dielectric runs entirely or partly in parallel with the plane of said tissue, connected symmetrically in an electric measuring device, a measuring instrument indicating differences in thickness of the two layers, and a third condenser having electrodes on opposite sides of the path of said gum tissue whereby the electrical field in the dielectric will run substantially perpendicular to the direction of the rubber layers so that the capacity of said third condenser will be a measure of the thickness of the two rubber layers together.

25. In a device for manufacturing tissue gummed on both sides, means for guiding the body of the tissue and for leading rubber layers to the opposite sides of said body, a condenser located on one side of the path of said tissue, another condenser located on the opposite side of said path, an electric measuring device in which said condensers are connected symmetrically, and means, controlled by said device, for varying the thickness of the individual rubber layers.

26. In a device for manufacturing tissue gummed on both sides, means for guiding the body of the tissue and for leading rubber layers to the opposite sides of said body, a condenser located on one side of the path of said tissue, another condenser located on the opposite side of said path, an electric measuring device in which said condensers are connected symmetrically, and a measuring instrument, controlled by said device, for indicating differences between the thicknesses of the two rubber layers.

27. In a device for manufacturing tissue gummed on both sides, means for guiding the body of the tissue and for leading rubber layers to the opposite sides of said body, a condenser located on one side of the path of said tissue, another condenser located on the opposite side of said path, an electric measuring device in which said condensers are connected symmetrically, and a third condenser having electrodes on opposite sides of the path of said gum tissue whereby the electrical field in the dielectric will run substantially perpendicular to the direction of the rubber layers so that the capacity of said third condenser will be a measure of the aggregate thickness of the two rubber layers.

28. In a device for manufacturing tissue gummed on both sides, means for guiding the body of the tissue and for leading rubber layers to the opposite sides of said body, a condenser located on one side of the path of said tissue, another condenser located on the opposite side of said path, an alternating current bridge in which said condensers are connected symmetrically, and a third condenser having electrodes on opposite sides of the path of said gum tissue whereby the electrical field in the dielectric will run substantially perpendicular to the direction of the rubber layers so that the capacity of said third condenser will be a measure of the aggregate thickness of the two rubber layers.

29. In a device for manufacturing tissue gummed on both sides, means for guiding the body of the tissue and for leading rubber layers to the opposite sides of said body, a condenser located on one side of the path of said tissue, another condenser located on the opposite side of said path, an electric measuring device in which said condensers are connected symmetrically, means, controlled by said device, for varying the thickness of the individual rubber layers, and a third condenser having electrodes on opposite sides of the path of said gum tissue whereby the electrical field in the dielectric will run substantially perpendicular to the direction of the rubber layers so that the capacity of said third condenser will be a measure of the aggregate thickness of the two rubber layers.

30. In a device for manufacturing tissue gummed on both sides, means for guiding the body of the tissue and for leading rubber layers to the opposite sides of said body, a condenser located on one side of the path of said tissue, another condenser located on the opposite side of said path, an electric measuring device in which said condensers are connected symmetrically, means, controlled by said device, for varying the thickness of the individual rubber layers, a measuring instrument, likewise controlled by said device, for indicating differences between the thicknesses of the two rubber layers, and a third condenser having electrodes on opposite sides of the path of said gum tissue whereby the electrical field in the dielectric will run substantially perpendicular to the direction of the rubber layers so that the capacity of said third condenser will be a measure of the aggregate thickness of the two rubber layers.

31. In a device for manufacturing tissue gummed on both sides, means for guiding the body of the tissue and for leading rubber layers to the opposite sides of said body, a condenser located on one side of the path of said tissue, another condenser located on the opposite side of said path, an electric measuring device in which said condensers are connected symmetrically, and a third condenser between the plates of which the tissue gummed on both sides is arranged to travel, so that the capacity of said third condenser will be a measure of the aggregate thickness of the two rubber layers.

HANS WALTER.